UNITED STATES PATENT OFFICE.

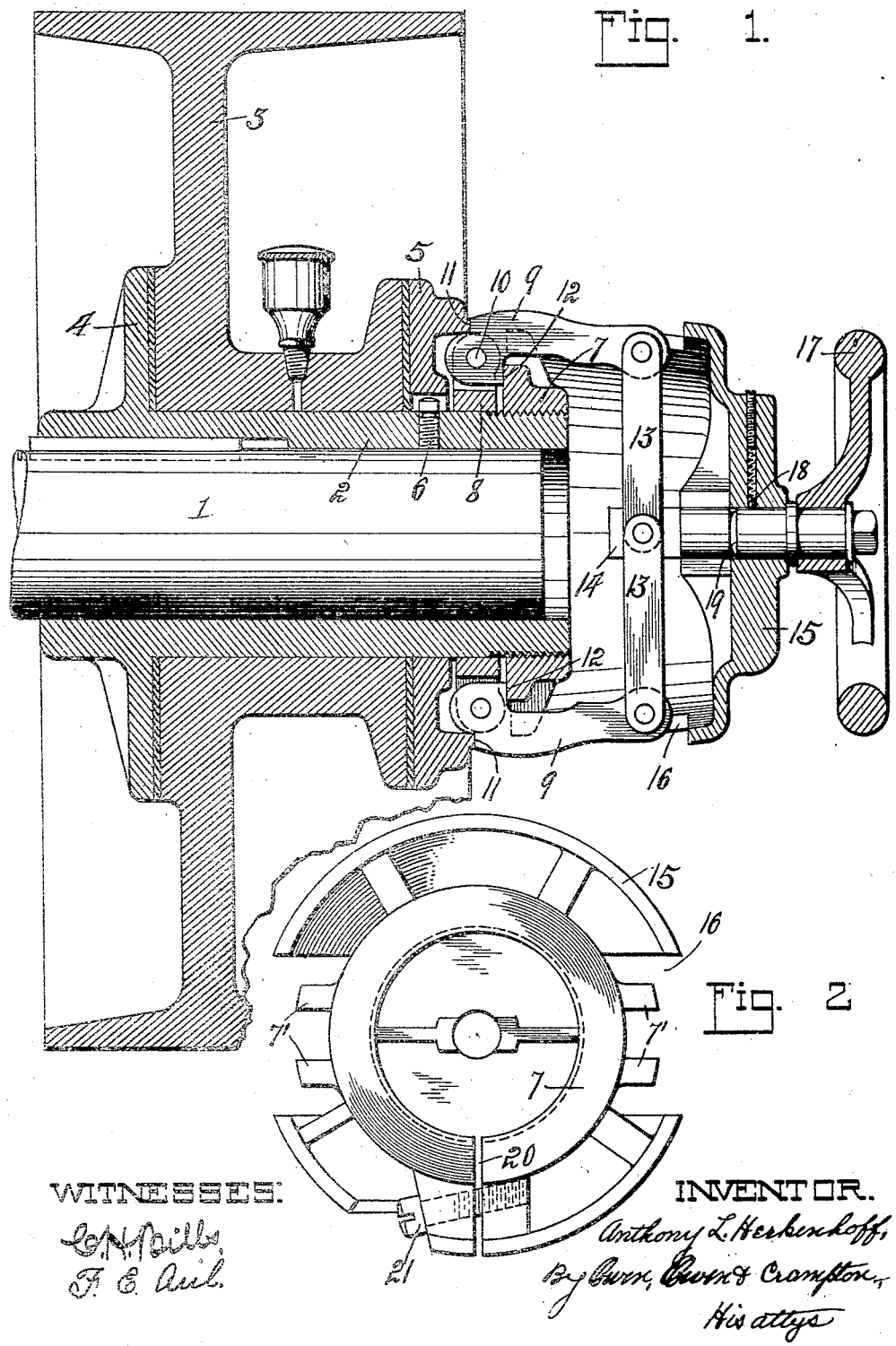

ANTHONY L. HERKENHOFF, OF MINSTER, OHIO.

CLUTCH.

1,130,972. Specification of Letters Patent. Patented Mar. 9, 1915.

Application filed September 10, 1914. Serial No. 861,109.

*To all whom it may concern:*

Be it known that I, ANTHONY L. HERKENHOFF, a citizen of the United States, and a resident of Minster, in the county of Auglaize and State of Ohio, have invented a certain new and useful Clutch; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to clutches and particularly to friction clutches of the type adapted for use in connection with small pulleys, gears or the like, but is not restricted to such use as it may be used in any connection for which it may be adapted or appropriate.

The object of my invention is the provision of a clutch of this character which is simple, strong and compact in its construction, easy of operation, has no springs or delicate parts to get out of order and is easily and quickly adjustable, thus admirably adapting it for use in connection with the pulleys of small internal combustion engines or the like.

A further object of my invention is to improve on the clutch shown and described in my copending application filed April 15, 1912, Serial No. 690,779, whereby to increase the power efficiency thereof.

The invention is fully described in the following specification, and while, in its broader aspect, it is capable of embodiment in numerous forms, a preferred embodiment thereof is illustrated in the accompanying drawings, in which,—

Figure 1 is a central longitudinal section of the clutch embodied in my invention in association with a pulley and shaft, and Fig. 2 is an inner end view of a portion of the clutch mechanism.

Referring to the drawings, 1 designates an engine or other drive shaft, and 2 a sleeve which is keyed to an end of the shaft for rotation therewith. A rotatable member which, in the present instance, is in the form of a pulley 3 is loosely mounted on the sleeve 2 and has one end of its hub in contact with an annular friction flange 4 on the inner end portion of the sleeve. A friction-ring 5 is mounted on the sleeve 2 in position to frictionally engage the pulley hub in opposition to the sleeve flange 4, said ring being mounted for axial shifting movements on the sleeve to adapt it to have movements relative thereto to engage or release the pulley hub. The friction ring 5 is held against turning relative to the sleeve 2 by the head or outer end of a screw 6 projecting into a registering race-way in the ring, as shown.

A thrust-collar 7 is threaded or otherwise suitably mounted on the outer end of the sleeve 2 for axial adjustment relative thereto and in axially spaced relation to the friction collar 5. Mounted on the sleeve 2 between the members 5 and 7 for free axial movements on the sleeve relative to said members is what may be termed a floating collar 8, which carries a clutch operating lever 9 at each of opposite sides thereof which levers are fulcrumed thereto, as indicated at 10.

Each lever 9 has thrust shoulders 11 and 12 at opposite sides of its fulcrum for contact with registering outer and inner surfaces of the members 5 and 7, respectively, whereby upon a movement of the lever in one direction on its fulcrum, said shoulders will act in an opposing manner against the members 5 and 7 to tend to force the same apart which action will result in a gripping of the pulley hub between the clutch parts 4 and 5, as is apparent. The levers 9 have the arms thereof to which power is applied projected outwardly over the thrust collar 7 longitudinally of the sleeve and connected at their outer ends by a pair of inwardly projecting toggle links 13, 13 to a common control plunger 14, which is movable axially of the sleeve 2 to impart movement to said levers. The plunger 14, in the present instance, is shown as having its bearing in the outer end of a shell 15, which is carried by and projects upward from the thrust-collar 7, as shown in Fig. 2. The shell 15 is provided at opposite sides thereof with openings 16 in which the levers 9 work, and the collar 7 is shown as having a pair of spaced guide ears 7¹ for each lever 9. A hand wheel 17 is preferably mounted in the outer end of the plunger 14 to provide means for grasping in effecting an inward or outward movement of the plunger.

It is apparent with the present clutch control mechanism that an inward movement of the plunger 14 to the position shown in Fig. 1 will effect a straightening of the toggle links 13, 13 and a consequent outward movement of the free ends of the levers 9, 9, while the thrust shoulders 11 and 12 thereof will be caused to act against the members 5 and 7 to force the former into clutch engagement with the pulley in opposition to the clutch flange 4.

18 designates a spring pressed detent which is mounted in the outer end portion of the shell 15 and engages within a circumferential groove 19 in the plunger 14 when such plunger is at the limit of its outward or clutch releasing movement. This detent and groove tend to resist an outward throwing of the free end of the levers 9, 9 by centrifugal action when the clutch control parts are in released position.

It is found in practice that the fulcruming of the levers 9 to the floating collar 8 is quite an important feature, as the collar is permitted to freely move to accommodate itself to the position of the lever fulcrum so that when clutch engaging movements are communicated to the levers 9, the fulcrum pins of the levers will be free from all strain while the entire pull exerted by the levers will be exerted on the adjustable stationary thrust collar 7 and the clutch ring 5. The fulcrum pins of the levers can therefore be made much lighter than would be possible if such pins were required to oppose the thrust of the levers on the clutch ring 5. It is also found that greater clutching or power efficiency can be obtained by mounting the control levers in this manner than is possible with the clutches of this character heretofore used. It is preferable to split the thrust collar 7 and shell 15 at one side thereof, as shown at 20 in Fig. 2, and to connect such split portions by a screw 21, whereby the collar 7 may be securely located in proper adjustment on the sleeve 2 by a tightening of said screw.

I wish it understood that my invention is not limited to any specific construction, arrangement or form of the parts, except in so far as such limitations are specified in the claims.

Having thus described my invention, what I claim as new, and desire to secure by Letters Patent, is,—

1. In combination, a rotatable member, an element loosely carrying said member and having stationary parts at opposite sides of said member, a shiftable clutch member for engagement with said rotatable member in opposition to one of said parts, a collar loosely mounted for axial shifting movements intermediate said clutch member and one of said stationary parts, and a clutch lever fulcrumed to said collar and operable to exert opposed thrust action on said clutch member and the adjacent stationary part.

2. In combination, a rotatable member, an element loosely carrying said member, said element having relatively movable clutch parts for said member and having a relatively stationary thrust part, and a control lever fulcrum intermediate said thrust part and the adjacent clutch part independently of each and operable to coact with said thrust part to impart relative clutch movements to said clutch parts and to frictionally unite said rotary member and element.

3. In combination, a rotatable member, an element loosely carrying said member, said element having relatively movable member clutching parts, a collar mounted for free axial movements on said element without one of said clutch parts, a thrust part adjustably carried by said element without said collar, and means having lever members fulcrumed to said collar and operable to exert opposing thrusts on said thrust part and one of said clutch parts to relatively move the clutch parts to engage said rotatable member.

4. In combination, a rotatable member, a shaft, a sleeve fixed to said shaft and loosely carrying said member, said sleeve having a fixed clutch part and a movable clutch part at opposite sides of a portion of said member, a thrust-collar adjustably mounted on said sleeve without said movable clutch part in spaced relation thereto, a floating-collar intermediate said thrust-collar and movable clutch part, levers fulcrumed to said floating-collar and movable to exert opposing thrusts on said thrust-collar and movable clutch part to effect a gripping of said member by the clutch parts, and means operable to control the movements of said levers.

5. In a device of the character described, a shaft, an element rotatable with said shaft and having fixed and axially movable coöperating clutch parts, a thrust-collar without said movable part, a member mounted intermediate said movable clutch part and thrust-collar for free axial movements, levers fulcrumed to said member and having shoulders for opposed thrust contact with said thrust-collar and movable clutch part and operable to move the movable clutch part toward its companion, and a common control means for said levers.

6. In a device of the character described, a shaft, an element rotatable with said shaft, and having fixed and axially movable coöperating clutch parts, a thrust-collar without said movable part, a member mounted intermediate said movable clutch part and thrust-collar for free axial movements, levers fulcrumed to said member and having shoulders for opposed thrust contact with said collar and movable clutch part and operable by movements of the levers to move said clutch part toward its companion, plunger mounted for shifting movement axially of said shaft, links connecting said plunger and levers, and means operable to yieldingly maintain said plunger in one position of its movement to resist an outward throwing of the levers by centrifugal action.

In testimony whereof, I have hereunto signed my name to this specification in the presence of two subscribing witnesses.

ANTHONY L. HERKENHOFF.

Witnesses:
LAWRENCE STEINEMANN,
JULIUS DILLMAN.